June 17, 1930.  A. PINTO  1,764,886

CONTROL SYSTEM

Original Filed Oct. 6, 1925   2 Sheets-Sheet 1

Anthony Pinto  INVENTOR
BY Walter ? Bradley  ATTORNEY

June 17, 1930.  A. PINTO  1,764,886

CONTROL SYSTEM

Original Filed Oct. 6, 1925   2 Sheets-Sheet 2

Anthony Pinto  INVENTOR
BY Walter E. S. Bradley  ATTORNEY

Patented June 17, 1930

1,764,886

UNITED STATES PATENT OFFICE

ANTHONY PINTO, OF NEW YORK, N. Y., ASSIGNOR TO OTIS ELEVATOR COMPANY, OF JERSEY CITY, NEW JERSEY, A CORPORATION OF NEW JERSEY

CONTROL SYSTEM

Original application filed October 6, 1925, Serial No. 60,769. Divided and this application filed April 27, 1928. Serial No. 273,290.

The invention relates to control systems and particularly to control systems for elevators.

This application is a division of application Serial No. 60,769, filed October 6, 1925.

In elevator control systems where the elevator motor is supplied with current by a variable voltage generator, the generator is required to operate over a wide range of E. M. F. values varying from a maximum in one direction to a maximum in the other. Where self-levelling apparatus is employed, the generator is required to operate at low values of E. M. F. in bringing the car to a level with a desired landing. Due to the hysteresis of the iron of the generator field, the E. M. F. values obtained for a given value of field current during levelling operation vary considerably, depending on the previous magnetic state of the machine and whether the car is approaching the landing or returning to the landing after an overrun. Such variations in E. M. F. values cause undesirable variations in the operation of the car during the levelling period.

One feature of the invention resides in energizing the field winding of a generator in such manner that the effects of hysteresis are obviated during periods when a low voltage is desired.

Other features and advantages will become apparent from the following description, taken in connection with the accompanying drawings wherein one embodiment of the invention is illustrated and in which.

Figure 1:
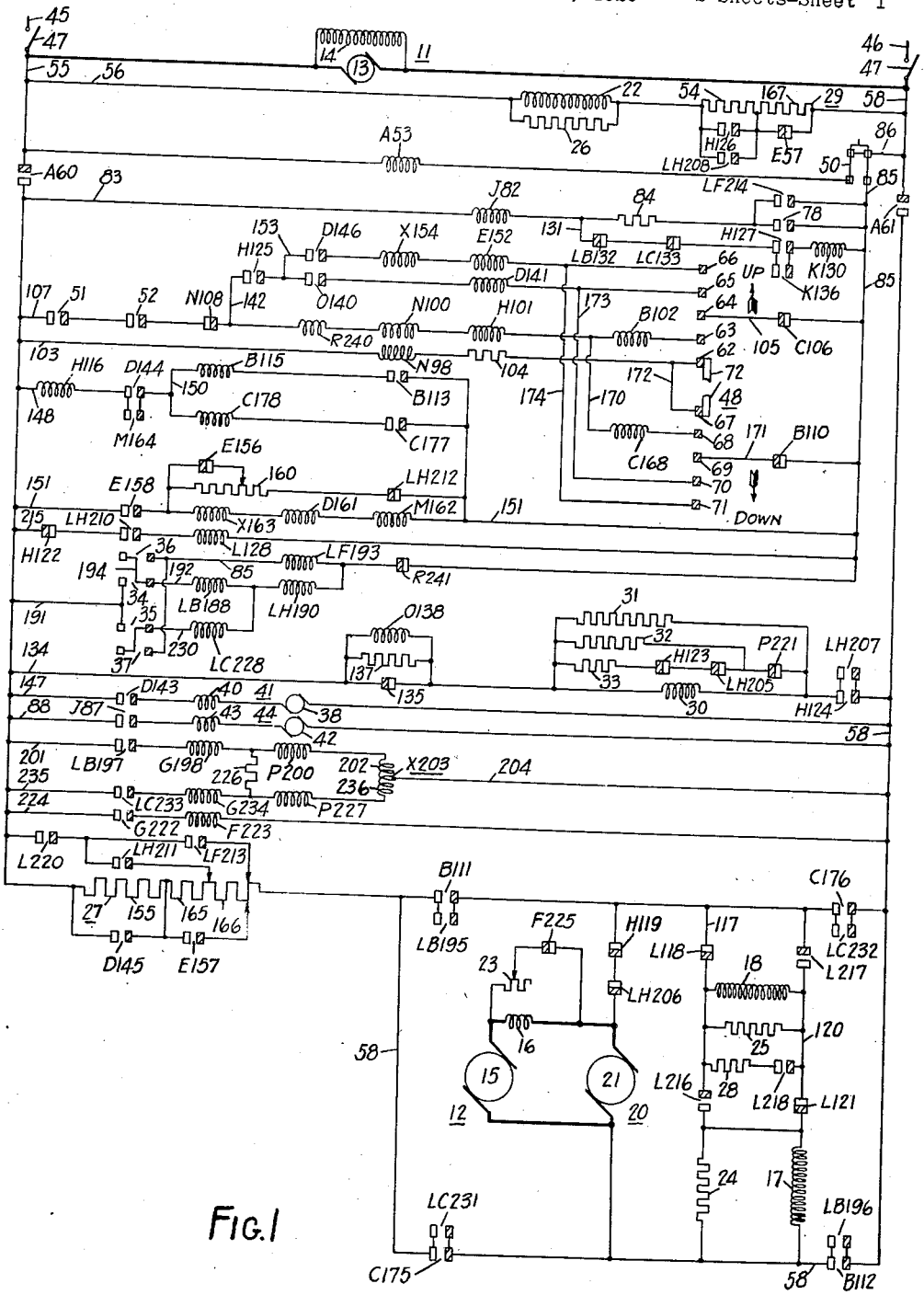
Figure 1 is a diagram of a elevator control system.

Referring to Figure 1, no attempt is made to show the coils and contacts of the various electromagnetic switches in their associated positions, a "straight" diagram being employed wherein the coils and contacts of the various switches are separated in such manner as to render the circuits involved relatively simple. Also the parts of other switches and apparatus are separated in the interest of simplifying the diagram. For a clearer understanding of the invention, the stationary contacts of the switches are illustrated in cross section. It is to be understood that the system in which the invention is illustrated is chosen merely for convenience of description and that, although described in conjunction with a car switch controlled system, the invention is equally applicable to other types of elevator systems such as push button control systems and to other systems employing a work motor supplied with current from the generator of a motor generator set.

The motor generator set comprises a driving motor 11, illustrated for convenience of description as of the direct current type, and a variable voltage direct current generator 12. The armature of the driving motor is designated 13 and its field winding 14. The armature of the generator is designated 15 and its series field winding 16, its separately excited field winding being arranged in two portions 17 and 18. The elevator motor is designated as a whole by the numeral 20, its armature being designated 21 and its field winding 22. An adjustable resistance 23 is arranged in shunt to the generator series field winding. Discharge resistances 24 and 25 are provided for the portions 17 and 18 respectively of the generator separately excited field winding. Discharge resistance 26 is provided for the elevator motor field winding 22. A resistance 27 is provided for controlling the strength of the generator field and therefore the voltage applied to the elevator motor armature during car switch operation. Another resistance 28 is provided for controlling the strength of the generator separately excited field during levelling operation. A resistance 29 controls the strength of the elevator motor field during different conditions of operation. 30 is the release coil for the elevator motor electromagnetic brake. This coil is provided with discharge resistances 31, 32 and 33 for controlling the application of the brake under different conditions of operation. 34 and 35 are the up slow speed contacts and the down slow speed contacts respectively of the levelling switch, the levelling switch up and down fast speed contacts being designated 36 and 37 respectively. 38 is the armature and 40 is the field winding of the motor 41 for moving the rollers of the levelling switch into position to clear the levelling cams. 42 is the armature and 43 is the field winding of the door control motor 44. 45 and 46 are the direct current supply mains. 47 is a double pole knife switch for connecting the system to the supply mains. In order to suit the type of diagram employed, the blades of this switch are shown separated. The car switch is designated as a whole by the numeral 48. 50 is the safety switch in the car. The series of door contacts are indicated by a single set of contacts 51. The gate contacts are indicated as 52. The various safety, limit, stop and emergency switches are omitted in order to simplify the description.

The electromagnetic switches have been designated as follows:

A—potential switch,
B—up main direction switch,
C—down main direction switch,
D—first accelerating switch,
E—second accelerating switch,
F—series field switch,
G—series field relay,
H—main brake and field switch,
J—door control motor switch,
K—door control motor maintaining relay,
L—field control switch,
M—maintaining relay,
N—sequence relay,
O—accelerating relay,
P—hard brake switch,
R—levelling control relay,
LB—up levelling direction switch,
LC—down levelling direction switch,
LH—levelling brake and field switch,
LF—fast speed levelling relay.

Throughout the description which follows, these letters, in addition to the usual reference numerals, will be applied to the parts of the above enumerated switches. For example, contacts B 111 are contacts on the up main direction switch, while actuating coil A 53 is the coil that operates the potential switch. The electromagnetic switches are shown in their deenergized positions. Reactances are similarly designated by the character X.

Upon the closing of the knife switch 47, the driving motor 11, elevator motor field winding 22 and potential switch actuating coil A 53 are energized, the circuit for coil A 53 being through safety switch 50. The driving motor starts in operation, bringing the generator 12 up to full speed. The series field winding and starting means for the driving motor are omitted to simplify the description. With the elevator motor at rest, the current supplied to its field winding 22 is reduced by section 54 of resistance 29, providing what may be termed a "standing field." The circuit for the elevator motor field winding may be traced from the left-hand blade of switch 47, line 55, by way of line 56 through field winding 22, resistance section 54 and second accelerating switch contacts E 57, line 58, to the right-hand blade of switch 47. It is not desired to apply full line voltage to the field winding 22 when the elevator motor is not in operation because of increased power consumption. On the other hand, it is not desired to have this field winding deenergized with the elevator motor at rest as a matter of safety and because of the time constant involved in building up. The potential switch, upon operation, causes the engagement of contacts A 60 and A 61, preparing the circuit for the generator separately excited field winding, the electromagnetic brake release coil and the control circuits. The condition of the circuits so far described might be termed normal.

Figure 2:
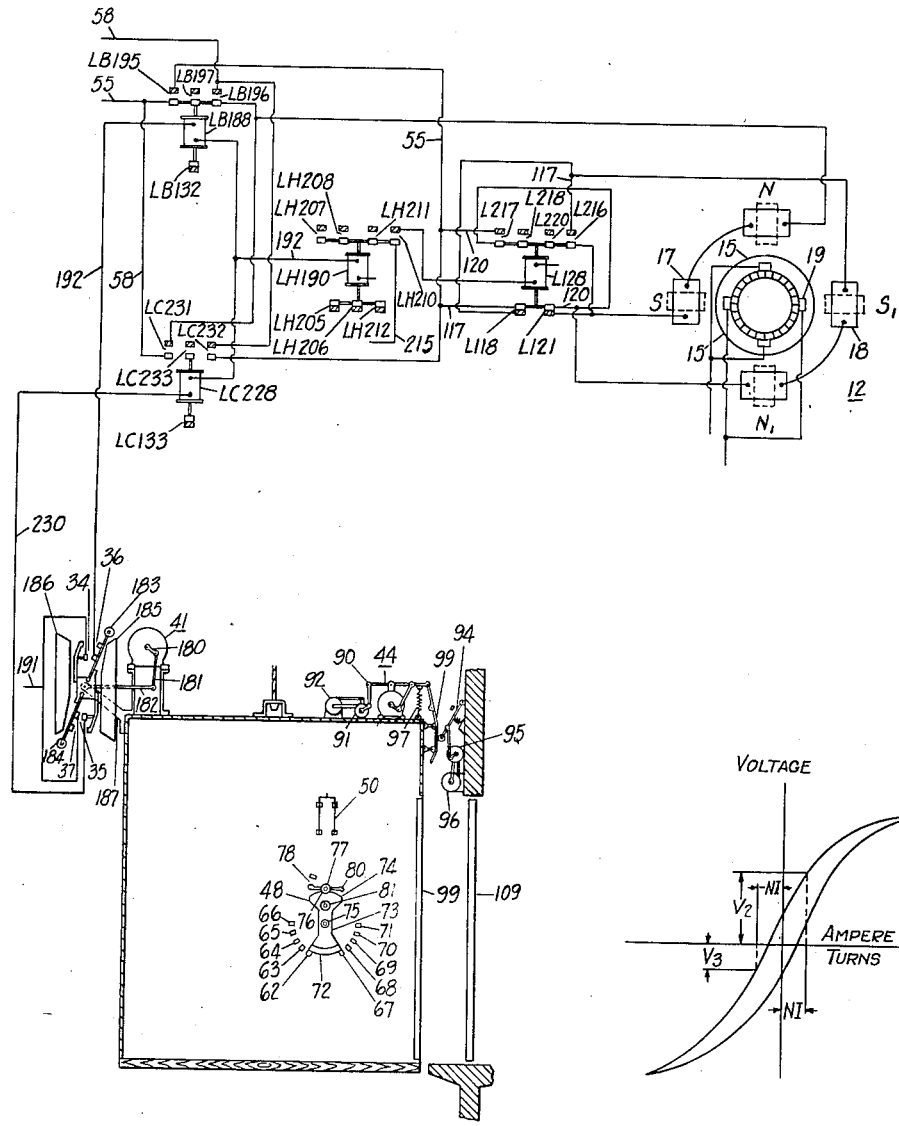
Figure 2 is a fragmental schematic view of a portion of the elevator system, illustrating particularly the manner in which the generator field winding is controlled during the levelling operation.

Referring briefly to Figure 2, the car switch 48 comprises a set of up contacts 62, 63, 64, 65 and 66 and a set of down contacts 67, 68, 69, 70 and 71. A contact segment 72 for bridging the contacts of each set is mounted on the segmental support 73 of insulating material. A cam 74 is formed on the support above the pivot point 75. The cam is formed with a centrally disposed depression 76 into which the operating roller 77 of the gate and door switch 78 extends with the car switch in "neutral" or off position. The switch 78 is pivoted at 80 so that movement of the car switch in either direction causes the engagement of the switch contacts. The car switch is operated by means of a control handle 81. It is preferred to provide centering springs (not shown) on the car switch to cause it to be returned to off position when released by the operator.

Referring back to Figure 1, assume that the system is designed for an installation of several floors and that the car is at rest at the first floor with the gate and door open. In the starting operation, the operator first gives the car switch a slight initial movement to effect the closure of the gate and door switch 78. For convenience of description, this switch is arranged to complete a circuit for the door control motor switch actuating coil J 82. This circuit may be traced from the left-hand blade of switch 47, by way of line 55 through contacts A 60, by way of line 83 through coil J 82, resistance 84 and switch 78, line 85, switch 50, line 86, line 58, to the right-hand blade of switch 47. The door control motor switch, upon operation, causes the engagement of contacts J 87, completing the circuit for the door control motor 44. This circuit may be traced from the left-hand blade of switch 47, by way of line 55 through contacts A 60, by way of line 88 through contacts J 87, door control motor field winding 43 and armature 42, by way of line 58 through contacts A 61, to the right-hand blade of switch 47.

Referring again to Figure 2, motor 44 operates pneumatic gate and door operating mechanism, as for example through linkage 90 to move valve 91 for gate engine 92 to gate closed position and to withdraw the retiring cam 93 from engagement with the roller provided on the end of the door engine valve lever 94. The lever 94 is operated by a spring to move valve 95 for the door engine 96 to door closed position. The gate and door engines operate through mechanism not shown to close the car gate 99 and hatchway door 109. It is to be understood that a door is provided in the hatchway at each landing.

Referring back to Figure 1, if the operator, after he has closed the gate and door, desires to open them, or if he desires to arrest their movement, he may do so by releasing the car switch to return to off position. This causes the opening of the gate and door switch 78 with the consequent deenergization of coil J 82 and the separation of contacts J 87. In this manner, the circuit for the motor 44 is broken. The spring 97, shown in Figure 2, operates upon the deenergization of motor 44 to move valve 91, and, through cam 93 and lever 94, valve 95 into positions to cause the reverse operations of the engines 92 and 96 to open the gate and door. Obviously other forms of power operated gate and door mechanisms, such as electric in lieu of pneumatic, may be employed without departing from the spirit of the present invention.

Assuming that the gate and doors are closed, the gate contacts 52 and door contacts 51 are in engagement. The operator may now move the car switch to full operated position to start the car in the up direction. It is to be noted that the gate and door switch 78 remains in closed position so long as the car switch is moved out of "neutral" position. Upon the engagement of contact segment 72 and contact 64, circuits are simultaneously completed for the oppositely wound coils N 98 and N 100 of the sequence relay, actuating coils R 240 of the levelling control relay, H 101 of the main brake and field switch and B 102 of the up main direction switch being in the circuit for coil N 100. The engagement of the contact segment and contacts 65 and 66 prepares circuits for the actuating coils of the accelerating switches.

The circuit for coil N 98 of the sequence relay may be traced from the right-hand blade of switch 47, by way of line 55 through contacts A 60, by way of line 103 through coil N 98 and resistance 104, contacts 62 and 64 of the car switch, by way of line 105 through contacts C 106 of the down main direction switch line 85, to the right-hand blade of switch 47 as above traced. The circuit for coil N 100 may be traced from the right-hand blade of switch 47, by way of line 55 through contacts A 60, by way of line 107 through door contacts 51, gate contacts 52, sequence relay contacts N 108, and coils R 240, N 100, H 101 and B 102, contacts 63 and 64 of the car switch, to the right-hand blade of switch 47 as above traced. The purpose of the sequence relay N is to insure the closure of the gate and doors before starting the car. Coils N 98 and N 100, being differentially wound, oppose each other, when energized simultaneously to prevent the operation of the relay. If either coil is energized ahead of the other, or if either coil alone is energized, contacts N 108 separate, preventing the starting of the car. If either the gate contacts 52 or any of the door contacts 51 are separated at the time that cars switch segment 72 engages contacts 64, coil N 98 alone is energized, resulting in the separation of contacts N 108. The separation of contacts N 108 prevents the energization of coil N 100, maintaining the sequence relay operated, and of coil B 102, preventing the operation of the up main direction switch to effect the starting of the car. The gate and door switch 78, therefore, is closed by the initial movement of the car switch so that the gate and door contacts may be closed before the engagement of segment 72 and contact 64. However, if the car switch is moved into position where segment 72 engages contact 64 before the closure of the door and gate contacts, the sequence relay operates to prevent the starting of the car. Thus it is impossible to start the car on the door or gate contacts.

Assuming that the sequence relay has operated, in order to start the car the car switch is returned to a position with segment 72 disengaged from contact 64, deenergizing coil N 98 to permit contacts N 108 to reengage. If the gate and door are closed, the car switch may be returned immediately to full on position. Otherwise, closing of the gate and door must be effected before the car switch is moved into full on position.

The levelling control relay R, upon operation, causes the separation of contacts R 241 in the circuit for the actuating coils of the levelling direction switches. The purpose of this arrangement will be described later.

It is preferred to provide the main direction switches with a mechanical interlock to prevent their simultaneous operation. Such an interlock may be of the form of a walking beam pivotally mounted for engaging catches on the armatures of these switches. Upon operation of the up main direction switch in response to the energization of its actuating coil B 102, contacts B 110 separate and contacts B 111, B 112 and B 113 engage. The separation of contacts B 110 breaks the circuit leading from the car switch down feed contact 69, contacts B 110 and the corresponding down direction switch contacts C 106 serving as electrical interlocks as is well understood in the art. The engagement of contacts B 113 prepares the circuit for the up main direction switch holding coil B 115 and the main brake and field switch holding coil H 116. The engagement of contacts B 111 and B 112 completes a circuit for the generator separately excited field winding. This circuit may be traced from the left-hand blade of switch 47, by way of line 55 through contacts A 60, resistance 27 and contacts B 111, by way of line 117 through field control switch contacts L 118, through portion 18 of the separately excited field winding, by way of line 120 through contacts L 121 and portion 17 of the separately excited field winding, by way of line 58 through contacts B 112 and contacts A 61, to the right-hand blade of switch 47.

The main brake and field switch H operates simultaneously with the main direction switch B. Switch H, upon operation, causes the separation of contacts H 119, H 122 and H 123 and the engagement of contacts H 124, H 125, H 126 and H 127. The separation of contacts H 119 disconnects the generator separately excited field winding from the generator armature. The purpose of this arrangement will be explained later. Contacts H 122 are in the circuit for the field control switch actuating coil L 128. The purpose of this arrangement also will be explained later. The separation of contacts H 123 disconnects resistance 33 from across the brake release coil 30. Resistance 33 being of low ohmic value, its disconnection before contacts H 124 engage prevents excess power consumption from mains 45 and 46. The engagement of contacts H 127 establishes a circuit for the door control motor maintaining relay actuating coil K 130. This circuit may be traced from the left-hand blade of switch 47, by way of line 55 through contacts A 60, by way of line 83 through coil J 82, by way of line 131 through up levelling direction switch contacts LB 132, down levelling direction switch contacts LC 133, contacts H 127 and coil K 130, line 85, to the right-hand blade of switch 47 as previously traced. The engagement of contacts H 125 further prepares the circuits for the actuating coils of the accelerating switches. The engagement of contacts H 126 short-circuits section 54 of the elevator motor field resistance 29, permitting the motor field to build up to its full strength. The engagement of contacts H 124 completes the circuit for the brake release coil 30. This circuit may be traced from the left-hand blade of switch 47, by way of line 55 through contacts A 60, by way of line 134 through contacts 135 operated by the brake, brake release coil 30 and contacts H 124, by way of line 58 through contacts A 61, to the right-hand blade of switch 47.

The door control motor maintaining relay coil K 130 in the circuit above traced is subject to the potential drop across resistance 84. The system is arranged so that the voltage thus applied to coil K 130 is sufficient to effect the operation of the relay. Contacts K 136 engage, upon the operation of the relay, to by-pass contacts H 127. The purpose of this arrangement will be seen from later description.

The brake release coil 30 being energized, the elevator motor field being connected directly to the mains 45 and 46 and current being supplied from the generator armature 15 to the elevator motor armature 21, due to the energization of the portions 17 and 18 of the generator separately excited field winding, the elevator motor starts. The portion 18 of the generator separately excited field winding as now connected assists the portion 17.

As the brake releases, the brake switch contacts 135 separate to insert cooling resistance 137 in series with the brake release coil. These brake switch contacts are preferably arranged to be separated at the end of the releasing operation. Separation of contacts 135 also breaks the short circuit around coil O 138, permitting the operation of the accelerating relay O. This relay operates to cause the engagement of contacts O 140, completing the circuit for the first accelerating switch actuating coil D 141. The purpose of this arrangement is to utilize the time constant of the brake for timing the acceleration of the motor, more specifically, for timing the operation of the first accelerating switch. Although the brake release coil is energized at the same time that power is supplied to the motor, the brake shoes do not lift at once because of the inherent time constant of the brake magnet and because the brake shoes and lever arms represent considerable mass to be set in motion. The circuit for coil D 141 completed by contacts O 140 may be traced from the right-hand blade of switch 47, by way of line 55 through contacts A 60, by way of line 107 through the door contacts 51, gate contacts 52 and contacts N 108, by way of line 142 through contacts H 125, contacts O 140 and coil D 141, contacts 65 and 64 of the car switch, to the right-hand blade of switch 47 as previously traced.

The operation of the first accelerating switch, in response to the energization of its actuating coil, causes the engagement of contacts D 143, D 144, D 145 and D 146. The engagement of contacts D 143 completes the circuit for the levelling switch motor 41. This circuit may be traced from the left-hand blade of switch 47, by way of line 55 through contacts A 60, by way of line 147 through contacts D 143, field winding 40 and armature 38 of motor 41, by way of line 58 through contacts A 61, to the right-hand blade of switch The starting of the car in the down direc-energization, to move the levelling switch operating rollers so as to clear the levelling cams during movement of the car. This operation will be explained later. The engagement of contacts D 144 completes the circuit for holding coils B 115 and H 116. This circuit may be traced from the left-hand blade of switch 47, by way of line 55 through contacts A 60, by way of line 148 through coil H 116 and contacts D 144, by way of line 150 through coil B 115 and contacts B 113, line 151, line 85, to the right-hand blade of switch 47 as previously traced. The purpose of the energization of these holding coils will be seen from later description. The engagement of contacts D 146 completes the circuit for the second accelerating switch actuating coil E 152. This circuit may be traced from the left-hand blade of switch 47, by way of line 55 through contacts A 60, by way of line 107 through door contacts 51, gate contacts 52 and contacts N 108, by way of line 142 through contacts H 125, by way of line 153 through contacts D 146, reactance X 154 and coil E 152, car switch contacts 66 and 64, to the right-hand blade of switch 47 as previously traced. The engagement of contacts D 145 short-circuits section 155 of resistance 27, increasing the voltage applied to portions 17 and 18 of the generator field winding. Thus the generator E. M. F. is increased, increasing the speed of the motor.

The second accelerating switch E does not operate immediately the circuit for its actuating coil is completed, its action being delayed by the effect of reactance X 154. Upon operation, contacts E 156 and E 57 separate and contacts E 157 and E 158 engage. The separation of contacts E 156 removes the shunt circuit around a portion of resistance 160. The separation of contacts E 156 before contacts E 158 engage prevents excess power consumption from mains 45 and 46. The engagement of contacts E 158 completes the circuit for the first accelerating switch holding coil D 161 and the maintaining relay actuating coil M 162. This circuit may be traced from the left-hand blade of switch 47, by way of line 55 through contacts A 60, by way of line 151 through contacts E 158, reactance X 163, coil D 161 and coil M 162, line 85, to the right-hand blade of switch 47 as previously traced. The maintaining relay contacts M 164 are thus caused to by-pass contacts D 144. The purpose of this arrangement will be described later. The engagement of contacts E 157 short-circuits sections 165 and 166 of resistance 27 to increase the voltage applied to portions 17 and 18 of the generator separably excited field winding. The E. M. F. of the generator, therefore, increases to its full value and the speed of the elevator motor increases. The separation of contacts E 57 removes the short circuit for section 167 of resistance 29 in the elevator motor field winding circuit, bringing the elevator motor up to full speed.

The starting of the car in the down direction is accomplished in a similar manner and will be only briefly described. The operator first moves the car switch into position to cause the closure of the gate and door and then into full on position where its contact segment 72 bridges contacts 67, 68, 69, 70 and 71. Thus the circuit is completed for the down main direction switch actuating coil C 168. This circuit may be traced from the left-hand blade of switch 47, through coil H 101 as previously traced, by way of line 170 through coil C 168, car switch contacts 68 and 69, by way of line 171 through contacts B 110, line 85, to the right-hand blade of switch 47 as previously traced. The circuit for coil N 98 is by way of line 172. The circuit for coil D 141 is by way of line 173. The circuit for coil E 152 is by way of line 174. The down main direction switch, upon operation, causes the separation of contacts C 106 and the engagement of contacts C 175, C 176 and C 177, these contacts corresponding with up main direction switch contacts B 110, B 111, B 112 and B 113 respectively. The holding coil of the down direction switch is designated C 178. Further than this, the operation of starting the car in the down direction is the same as described for starting it in the up direction.

Assume that the car is running in the up direction and that the operator centers the car switch between the second and third floors in order to stop at the third floor landing. Thus the contact segment 72 moves off contacts 66, 65, 64 and 63 and the circuits for the second accelerating switch actuating coil E 152, first accelerating switch actuating coil D 141, main brake and field switch actuating coil H 101, up main direction switch actuating coil B 102, levelling control relay coil R 240 and sequence relay coils N 98 and N 100 are broken. The levelling control relay and the second accelerating switch drop out immediately. The first accelerating switch, main brake and field switch and up main direction switch are maintained operated, however, by holding coils D 161, H 116 and B 115 respectively. The deenergization of coils N 98 and N 100 is in preparation for the next starting operation. It is to be noted that switch 78 is opened by the centering of the car switch. The circuit for coil J 82, however, is maintained through contacts H 127 and K 136 in parallel and coil K 130.

The levelling control relay, upon dropping out, causes the reengagement of contacts R 241. As previously stated, the purpose of this relay will be explained later.

The second accelerating switch, upon dropping out, causes the separation of contacts E 157 and E 158 and the reengagement of contacts E 57 and E 156. The separation of contacts E 157 reinserts sections 165 and 166 of resistance 27 in series with the generator separately excited field winding to decrease the E. M. F. of the generator. The engagement of contacts E 57 short-circuits section 167 of resistance 29, increasing the strength of the elevator motor field for the stopping operation. With the generator E. M. F. lowered and the strength of the elevator motor field increased, the speed of the elevator motor is decreased. The separation of contacts E 158 breaks the circuit for holding coil D 161 and coil M 162. The first accelerating switch D and maintaining relay M do not drop out immediately, however, their action being delayed by the effect of reactance X 163 in series with the coils and the discharge resistance 160 in parallel with the reactance and the coils. The engagement of contacts E 156 to short-circuit a portion of resistance 160 is effective to prolong the time element of the switch and relay. The time element may be adjusted to the desired value by changing the amount of the resistance portion short-circuited. Relay M is preferably adjusted to hold in at a smaller current value than the accelerating switch D. This may be readily accomplished due to the fact that the relay is much smaller and therefore lighter in construction than the accelerating switch and requires less current to hold in.

The first accelerating switch, upon dropping out, causes the separation of contacts D 143, D 144, D 145 and D 146. The separation of contacts D 144 is in preparation for the next starting operation, contacts M 164 remaining in engagement to maintain holding coils H 116 and B 115 energized. The separation of contacts D 146 also is in preparation for the next starting operation, the circuit for coil E 152 having been broken by the movement of the car switch as above described. The separation of contacts D 145 removes the short circuit for section 155 of resistance 27, decreasing the strength of the generator field. Thus the generator E. M. F. is again decreased and the speed of the elevator motor is reduced. It is to be understood that resistance 27 may be controlled in any number of steps, two being shown merely for convenience of description.

The separation of contacts D 143 deenergizes the levelling switch motor 41. In this manner the operating rollers of the levelling switch are extended for engagement by the levelling cams. Referring briefly to Figure 2, the levelling switch motor is operatively connected to the levelling switch by means of an arm 180 on the motor shaft, a connecting link 181 and a lever 182. In the starting operation, the motor 41 being energized, arm 180 rotates, acting through link 181 and lever 182 to move the levelling switch as a whole about a pivot. In this manner the levelling switch operating rollers 183 and 184 are moved into position where they do not engage the levelling cams 185 and 186 during motion of the car, a stop being provided to determine the extent of the movement. It is to be understood that levelling cams are provided for each floor. The levelling switch is pivoted on a bracket 187 secured to the car frame. In the stopping operation, upon the deenergization of the levelling switch motor, a spring (not shown) moves the lever 182 and therefore the levelling switch back into the first described position with the rollers 183 and 184 extended for engagement by the levelling cams. Each pair of levelling switch contacts 34, 35, 36 and 37 comprises a stationary contact and a movable contact operated by the engagement of its corresponding roller and levelling cam. The fast speed contacts 36 and 37 are arranged to separate before their corresponding slow speed contacts 34 and 35 in the levelling operation. Springs (not shown) are provided for causing the separation of the contacts of the pairs as the levelling operation is effected and stops are provided for determining the extent of movement of the rollers as they ride off the levelling cams.

It will be assumed that the car has not reached the landing and that the up levelling switch operating roller 183 moves onto the vertical surface of up levelling cam 185 before relay M drops out. The engagement of levelling switch up slow speed contacts 34 completes a circuit for the up levelling direction switch actuating coil LB 188 and the levelling brake and field switch actuating coil LH 190. This circuit may be traced from the left-hand blade of switch 47, by way of line 55 through contacts A 60, line 191, levelling switch contacts 34, by way of line 192 through coil LB 188 and coil LH 190, by way of line 85 through levelling control relay contacts 241, to the right-hand blade of switch 47 as previously traced. The engagement of the levelling switch up fast speed contacts 36 completes the circuit for fast speed levelling relay actuating coil LF 193. This circuit may be traced from the left-hand blade of switch 47, by way of line 55 through contacts A 60, line 191, levelling switch contacts 34, line 194, levelling switch contacts 36, by way of line 85 through coil LF 193 and contacts R 241, to the right-hand blade of switch 47 as previously traced. It is to be noted that, due to the fact that the circuit for coil LF 193 is through levelling switch slow speed contacts 34, the circuit for coils LB 188 and LH 190 must be made in order that the circuit for coil LF 193 may be completed.

The up levelling direction switch LB, upon operation, causes the separation of contacts LB 132 and the engagement of contacts LB 195, LB 196 and LB 197. Contacts LB 132 will be referred to later. Contacts LB 195 and LB 196 by-pass main direction switch contacts B 111 and B 112 respectively in the circuit for the generator separately excited field winding. The engagement of contacts LB 197 completes the circuit for up series field relay actuating coil G 198 and up hard brake switch actuating coil P 200. This circuit may be traced from the left-hand blade of switch 47, by way of line 55 through contacts A 60, by way of line 201 through contacts LB 197, coil G 198, coil P 200, and portion 202 of reactance X 203, line 204, by way of line 58 through contacts A 61, to the right-hand blade of switch 47.

The levelling brake and field switch, operating simultaneously with the up levelling direction switch, causes the separation of contacts LH 205, LH 206 and LH 212 and the engagement of contacts LH 207, LH 208, LH 210 and LH 211. Contacts LH 205 are in the circuit for resistance 33 across the brake release coil. Contacts LH 206 are in series with contacts H 119 in the circuit for connecting the generator separately excited field winding to the generator armature. Contacts LH 212 break the shunt circuit, comprising resistance 160, for coils D 161 and M 162. Contacts LH 207 by-pass contacts H 124 in the circuit for the brake release coil. Contacts LH 208 by-pass contacts H 126 in the circuit for section 54 of the motor field resistance 29. Contacts LH 210 are in the circuit for the field control switch actuating coil L 128. The engagement of contacts LH 210 is without effect at this time as contacts H 122 are separated. The purpose of contacts LH 205, LH 206, LH 207, LH 208 and LH 210 will be seen as the description proceeds. Contacts LH 211, upon their engagement, prepare a circuit for short-circuiting section 155 and adjustable section 165 of resistance 27 for the generator separately excited field winding.

The fast speed levelling relay, upon operation, causes the engagement of contacts LF 213 and LF 214. The engagement of contacts LF 213 prepares a circuit for short-circuiting the adjustable section 166 of resistance 27 for the generator separately excited field winding. The engagement of contacts LF 214 by-passes contacts LB 132, LC 133, H 127 and K 136, coil K 130 and switch 78 through resistance 84 in a circuit for coil J 82 of the door control motor switch. Since the engagement of contacts LF 214 generally occurs substantially simultaneously with the separation of contacts LB 132, the switch J does not drop out. Even if switch J should drop out, the immediate reenergization of coil J 82 upon the engagement of contacts LF 214 would prevent the operation of the gate and door operating mechanism due to the time required for the mechanism to start in operation. The circuit for the door control motor maintaining relay coil K 130, however, is broken by the separation of contacts LB 132.

The separation of contacts LH 212 to break the circuit for resistance 160 as above set forth causes relay M to drop out and separate contacts M 164. As a result the circuit for holding coils B 115 and H 116 is broken, permitting the up main direction switch and main brake and field switch to drop out. Switch B, upon dropping out, causes the separation of contacts B 111, B 112 and B 113 and the engagement of contacts B 110. The separation of contacts B 113 and the engagement of contacts B 110 is in preparation for the next starting operation. The separation of contacts B 111 and B 112 is without effect as they are by-passed by contacts LB 195 and LB 196 to maintain the energization for the generator separately excited field winding. The switch H, upon dropping out, causes the separation of contacts H 124, H 125, H 126 and H 127 and the engagement of contacts H 119, H 122 and H 123. The separation of contacts H 125 and H 127 is in preparation for the next starting operation. The separation of contacts H 124 and H 126 is without effect, the circuit for the brake release coil 30 being maintained by contacts LH 207 and section 54 of resistance 29 remaining short-circuited by contacts LH 208. The engagement of contacts H 119 and H 123 also is without effect as the circuits for reconnecting the generator separately excited field winding to the generator armature is maintained broken by contacts LH 206 and the shunt circuit for the brake release coil 30 comprising resistance 33 is maintained broken by contacts LH 205. The engagement of contacts H 122, however, completes the circuit for the field control switch actuating coil L 128. This circuit may be traced from the left-hand blade of switch 47, by way of line 55 through contacts A 60, by way of line 215 through contacts H 122, contacts LH 210 and coil L 128, line 85, to the right-hand blade of switch 47 as previously traced.

The field control switch L, upon operation, causes the separation of contacts L 118 and L 121 and the engagement of contacts L 216, L 217, L 218 and L 220. The separation of contacts L 118 and L 121 breaks the circuit for portions 17 and 18 of the generator separately excited field winding. The immediate engagement of contacts L 216 and L 217, however, reconnects the portions to the mains. The polarity of the latter connection is such that the current supplied to portion 18 flows in such direction as to create a magnetizing force which opposes the magnetizing force due to portion 17.

Discharge resistances 24 and 25 act to smooth out not only the changes in generator E. M. F. due to the reinsertion of resistance 27 in circuit with the separately excited field winding in steps, but also the change due to the disconnection and reconnection of the portions 17 and 18 to the mains.

The engagement of contacts L 218 connects resistance 28 in parallel with field winding portion 18 so that the current in portion 18 is less than that in portion 17. Thus the magnetizing force due to portion 18 is less than that due to portion 17. The engagement of contacts L 220 completes the short circuit for resistance 27 through the fast speed levelling relay contacts LF 213. With contacts L 118 and L 121 separated and contacts L 216, L 217, L 218, L 220 and LF 213 in engagement, an E. M. F. is generated which causes the elevator motor to run at a suitable fast levelling speed, as will be seen from later description.

Relay G and switch P do not operate immediately their actuating coils are energized, their action being delayed by reactance X 203. Switch P, however, is adjusted to operate almost immediately and, upon operation, causes the separation of contacts P 221, disconnecting resistance 32 from across the brake release coil 30. Relay G, upon operation, causes the engagement of contacts G 222, completing the circuit for the series field switch actuating coil F 223. This circuit may be traced from the left-hand blade of switch 47, by way of line 55 through contacts A 60, by way of line 224 through contacts G 222 and coil F 223, by way of line 58 through contacts A 61, to the right-hand blade of switch 47. Switch F, upon operation, causes the separation of contacts F 225, breaking the circuit including resistance 23 in shunt to the generator series field winding 16. The generator series field is so wound that, without the parallel resistance 23, it would have too great an effect for proper operation of the car. The desired compounding is obtained by employing the low resistance shunt. Upon separation of contacts F 225, the strength of the series field is increased for the levelling operation so as to aid in bringing the motor to a stop. The short delay in the action of relay G, and therefore switch F, upon the initiation of the levelling operation, is desirable in order that the current in the generator armature-elevator motor armature circuit may adjust itself to such a value that proper series field strength during the levelling operation may be obtained.

As the car nears the third floor landing, roller 183 rides off the vertical surface onto the oblique surface of cam 185. This results in the separation of levelling switch up fast speed contacts 36, deenergizing fast speed levelling relay coil LF 193. Relay LF, upon dropping out, causes the separation of contacts LF 213 and LF 214. The separation of contacts LF 213 removes the short circuit around section 166 of resistance 27, sections 155 and 165 remaining short-circuited by contacts LH 211. The generator E. M. F. is thus lowered and the elevator motor runs at its slow levelling speed. The separation of contacts LF 214 breaks the circuit for the door control motor switch coil J 82. Switch J, upon dropping out, causes the separation of contacts J 87 to deenergize the motor 44, thus effecting the automatic gate and door opening operation. The gate and door operating mechanism functions in the same manner as described for opening the gate and door in response to centering the car switch. In this manner the automatic gate and door opening operation is timed so that the gate and door open as the car stops at the landing. It is to be noted, however, that the automatic gate and door opening operation cannot take place until the levelling switch fast speed contacts separate.

Shortly before the car reaches the exact level with the landing, the roller 183 rides off the oblique surface of cam 185, thereby separating the levelling switch up slow speed contacts 34. The circuit for coils LB 188 and LH 190 is thus broken. Switch LH drops out, causing the separation of contacts LH 207, LH 208, LH 210 and LH 211 and the reengagement of contacts LH 205, LH 206 and LH 212. The engagement of contacts LH 212 is in preparation for the next starting operation. The separation of contacts LH 211 also is in preparation for the next starting operation, the circuit for the generator separately excited field winding being broken as a result of the separation of up levelling direction switch contacts LB 195 and LB 196 as will be set forth below. The separation of contacts LH 207 breaks the circuit for the brake release coil 30 and the accelerating relay coil O 138. Due to the fact that the coil 30 discharges into resistance 31 of relatively high ohmic value, a "hard" application of the brake is obtained. The accelerating relay O drops out, separating contacts O 140 in preparation for the next starting operation. The separation of contacts LH 208 reinserts section 54 of resistance 29 in series with the elevator motor field winding, reducing the current therein to a "standing field" value. The separation of contacts LH 210 breaks the circuit for the field control switch coil L 128, the switch dropping out in preparation for the next starting operation. It is to be noted that the separation of contacts L 216 and L 217 and the engagement of contacts L 118 and L 121 reconnects the portions 17 and 18 of the separately excited field winding for cumulative action. The reengagement of contacts LH 206 reconnects the generator separately excited field winding to the generator armature. The polarity of this connection is such that the generator sends current through the field winding in such manner as to oppose the flux which produces the generator E. M. F., thus tending to destroy the residual flux of the generator field.

Up levelling direction switch LB, dropping out along with switch LH, causes the separation of contacts LB 195, LB 196 and LB 197 and the engagement of contacts LB 132. The engagement of contacts LB 132 is in preparation for the next starting operation. The separation of contacts LB 195 and LB 196 disconnects the generator separately excited field winding from the mains as indicated above. The separation of contacts LB 197 breaks the circuit for coils G 198 and P 200. The relay G drops out immediately, but the dropping out of switch P is delayed slightly due to the effect of the reactance X 203 and discharge resistance 226. It is to be noted that the discharge current for up coil P 200 and the reactance passes through down coil P 227 in such direction as to cause coil P 227 to assist coil P 200 in maintaining switch P in operated condition. Relay G, upon dropping out, causes the separation of contacts G 222 to deenergize coil F 223, switch F dropping out in turn to cause the engagement of contacts F 225. The engagement of contacts F 225 reconnects resistance 23 in parallel with the generator series field winding 16. Switch P, upon dropping out, causes the engagement of contacts P 221.

Thus the brake being applied and the generator separately excited field winding being disconnected from the mains, the car is brought to rest level with the third floor landing. The engagement of contacts LH 205, along with the delayed engagement of contacts P 221, places discharge resistances 32 and 33 in parallel with the brake release coil 30 to "soften" the application of the brake.

With the sequence of operations as above described the car will be slowed down and stopped level with the desired landing without sacrifice of smoothness. However, should the car switch be centered with the car at a greater distance from the landing, the maintaining relay would hold in to effect, through its contacts M 164, the retention of the main direction switch and main brake and field switch in operated condition. Should relay M drop out before the levelling switch contacts engage, the subsequent engagement of the levelling switch contacts as the levelling switch roller rides on to the cam would cause the operation of switches LB and LH and relay LF to bring the car to a level with the floor. In the event that the car switch is centered late in the stopping operation, as for example when the levelling switch operating roller strikes the levelling cam upon the dropping out of the first accelerating switch D, the immediate separation of contacts LH 212 forces the dropping out of the main direction switch and the main brake and field switch to permit the immediate change of the field winding connections and thus slow down the elevator motor more rapidly. In this manner the tendency for the car to overrun the floor is reduced.

Should an overrun occur, however, the system is arranged so that the operation of the switches is modified. Assuming in the above example that the car overruns the third floor landing to the extent of causing the engagement of levelling switch down slow speed contacts 35, a circuit is completed for down levelling direction switch actuating coil LC 228 and coil LH 190. This circuit may be traced from the left-hand blade of switch 47, by way of line 55 through contacts A 60, line 191, contacts 35, by way of line 230 through coil LC 228, by way of line 192 through coil LH 190, line 85, to the right-hand blade of switch 47 as previously traced. Contacts LH 205, LH 206 and LH 212 are separated and contacts LH 207, LH 208, LH 210 and LH 211 are engaged so that the circuit for resistance 33 across the brake release coil is broken, the brake release coil is energized, resistance section 54 for the elevator motor field winding is short-circuited and the field control switch actuating coil L 128 is energized. Contacts LH 212 insure the dropping out of the main direction switch. Switch L operates as previously described to cause the separation of contacts L 118 and L 121 and the engagement of contacts L 216, L 217, L 218 and L 220. The switch LC operates to cause the separation of contacts LC 133 and the engagement of contacts LC 231, LC 232 and LC 233. The separation of contacts LC 133 is without particular effect at this time. The separation of contacts LH 206, L 118 and L 121 and the engagement of contacts LC 231, LC 232, L 216 and L 217 causes the disconnection of the separately excited field winding from the generator armature and the connection of portions 17 and 18 of the winding to the mains in such manner as to cause their magnetizing forces to act in opposition. The engagement of contacts LH 211 and L 220 short-circuits resistance sections 155 and 165, causing the application of the desired voltage to the generator separately excited field winding. Resistance 28, reconnected across portion 18 of the winding, as before causes less current flow through portion 18 than through portion 17. Due to the reversal of the flow of current through both portions of the separately excited field winding from that during the levelling operation upon the car approaching the floor in the up direction, the car is caused to start in the down direction.

The engagement of contacts LC 233 completed a circuit for the down series field relay actuating coil G 234 and the down hard brake switch actuating coil P 227. This circuit may be traced from the left-hand blade of switch 47, by way of line 55 through contacts A 60, by way of line 235 through contacts LC 233, coil G 234, coil P 227 and portion 236 of reactance X 203, line 204, by way of line 58 through contacts A 61, to the right-hand blade of switch 47. Relay G and switch P do not operate immediately upon the engagement of contacts LC 233. When approaching the floor in the up direction, the current flowing through reactance portion 202 caused a flux to be built up in the reactance X 203 in one direction. Upon the separation of contacts LB 197, the current in the reactance and coil P 200 discharged into resistance 226 tending to maintain the flux build up and, as previously explained, switch P in operated condition. Upon the engagement of contacts LC 233 on the overrun, the current supplied to coils G 234 and P 227 must reverse the flux in the reactance, thus taking a longer time to build up to a value sufficient to cause the operation of relay G and switch P. Thus contacts F 225, depending for their operation upon the operation of relay G, remain closed temporarily to insure that the current in the generator armature-motor armature circuit has fallen to a low value. Since the current in the series field winding may be flowing in a direction such as to cause the generation of an E. M. F. which is of proper polarity for operating the car in the down direction, immediate increase in the strength of the series field might result in an overrun in the down direction. As the car returns to the floor, it is stopped by the separation of the levelling switch slow speed contacts 35 in a manner similar to that described for approaching the floor in the up direction.

If the overrun is great enough to cause the engagement of the levelling switch down fast speed contacts 37 as well as the levelling switch down slow speed contacts 35, coil LF 193 is energized. As before, relay LF causes the engagement of contacts LF 213 to short-circuit resistance section 166, increasing the generator voltage and causing the elevator motor to run at its fast levelling speed. Relay LF also causes the engagement of contacts LF 214 to energize coil J 82 again in the event that it has become deenergized. Upon such an overrun, the automatic gate and door opening operation does not occur until contacts LF 214 separate, as previously described. Further than this, the operation on an overrun is as above described.

It is to be understood that the operator may control both the acceleration and retardation of the car by moving the car switch in steps. In the event that the operator starts the car from a floor by moving the car switch only so far as to engage one of the feed contacts, for example contact 64, the up main direction switch B and main brake and field switch are operated to complete the circuit for the generator field winding, by the engagement of contacts B 111 and contacts B 112, and to cause the release of the brake, by the engagement of contacts H 124. As the actuating coil of the first accelerating switch D is not energized, this switch does not operate and the levelling switch motor is not energized to move the levelling switch rollers to clear the cams. The levelling control relay R, however, operating along with switches B and H, causes the separation of contacts R 241 and thus prevents the energization of the down levelling switch actuating coil LC 228 as a result of the operation of the levelling switch during the upward movement of the car away from the floor. Contacts LC 231 and LC 232, therefore, do not engage, preventing the establishing of a shunt circuit around the generator separately excited field winding. Should the operator suddenly move the car switch from one position into the other, for example from up into down position, injury to the system is prevented by contacts B 110 which remain separated until the up direction switch drops out. It is to be noted that, when the car is suddenly reversed or stopped between floors or stopped by opening the safety switch 50, the switch P is not operated. Thus contacts P 221 are in engagement and a "soft" application of the brake is obtained.

Figure 3:
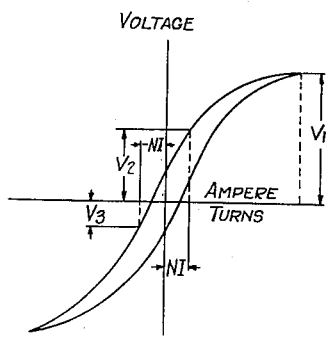
Figure 3 is a hysteresis curve employed to illustrate the invention.

In variable voltage control systems of the type wherein the elevator motor is supplied with current from the generator of a motor-generator set, the generator is required to operate over a wide range of E. M. F. values, varying from a maximum in one direction to a maximum in the other. When operating at low values, the E. M. F. generated, with a given field current, may vary over a wide range due to the varying effects of residual flux. This effect is very marked under levelling operating conditions where low values of generated E. M. F. are employed. Such low values of E. M. F. are usually obtained by permitting only a small amount of current to flow through the generator separately excited field winding so as to produce low values of flux. Thus the residual flux present forms a large percentage of the total flux and therefore affects the operation of the system very markedly. In order that the effects of the residual flux may be clearly seen, reference may be had to the assumed hysteresis curve shown in Figure 3. This figure illustrates the conditions when a small current is supplied to the separately excited field winding of a generator, as during the levelling operation. The magnetizing forces due to this small current are represented as NI and —NI, depending on whether the car is approaching the floor, or returning to the floor after an overrun. Assume that the generator armature E. M. F. has been of the value $V_1$ and that later, in attempting to make a landing, the self-levelling operation takes place with the car approaching the floor. The E. M. F. of the generator during this period will be of a value $V_2$. On the other hand, if the car overruns the floor, the E. M. F. of the generator will be of a value $V_3$, which value is much less than the value $V_2$. Hence the speed of the elevator motor is much less. The values $V_2$ and $V_3$ of the generator E. M. F. may vary during operation of the system depending upon the previous magnetic state of the machine. Assuming that the E. M. F. values $V_2$ and $V_3$ are those obtained during levelling for normal operation, then the values of generator E. M. F. during levelling will lie somewhere between $V_2$ and $V_3$ for other conditions of operation. Obviously, such large voltage variations would result in undesirable variations in operation under levelling conditions. These variations cannot be satisfactorily corrected merely by adjusting the amount of resistance in series with the separately excited field winding. For example, if the amount of resistance were decreased in order to raise the value of $V_3$, the value $V_2$ also would be increased, resulting in an increasing tendency to run past the floor. Similarly, if the amount of resistance were increased in order to lower the value of $V_2$, the value of $V_3$ also would be lowered, which value might be too low to effect the return of the car to the floor after an overrun. If the effects of residual flux are eliminated for levelling operating conditions, the system may be adjusted so as to obtain more uniform operation. This may be accomplished by reversing the polarity of certain of the field poles. The preferred arrangement for effecting this change has already been described in connection with Figure 1. The particular arrangement of the separately excited field winding is illustrated in Figure 2.

Referring to Figure 2, it is preferred to group the coils for the north and south poles N and S together to form the portion 17 and those for the north and south poles $N_1$ and $S_1$ together to form the portion 18. The coils forming the portion 17 are connected in series relation as are those forming the portion 18. With the switch L in deenergized position, as during car switch operation, the current flows through the coils in such manner as to provide the poles of alternate polarity as indicated. Upon the operation of switch L during the levelling operation, contacts L 118 and L 121 separate and contacts L 216 and L 217 engage. Although this operation does not affect the direction of the flow of current through the coils for poles N and S, it does reverse the current through the coils for poles $N_1$ and $S_1$. Thus $N_1$ becomes a south pole and $S_1$ becomes a north pole. If these poles were excited equally, the value of the total E. M. F. at the generator brushes 19 would be substantially zero, since the voltage generated in part of the generator armature is balanced out by a voltage of equal value but opposite polarity generated in the remainder of the armature. By employing a large magneting force for each pole, with the magnetizing force for the poles $N_1$ and $S_1$ excited by field winding portion 18 of less value than that for poles N and S excited by portion 17, an E. M. F. of low value suitable for the levelling operation may be obtained. In this manner, the iron of the various parts of the magnetic circuit is worked on high portions of the hysteresis loop where the effect of residual flux is practically nil, and E. M. F.'s may be obtained, during levelling operations, the values of which are not affected by residual flux and are practically the same whether the car overruns or underruns the floor. This may be accomplished by short-circuiting resistance 27 with contacts L 220, LH 211 and LF 213 and by connecting resistance 28 in parallel with portion 18, employing contacts L 218. The above described arrangement will operate to obviate the effects of hysteresis with generators of other pole numbers, a four pole generator being chosen merely for convenience of description. In describing the invention, the usual series armature winding has been assumed. If for any reason, such as due to the manner of winding the generator armature, an E. M. F. is generated upon reversal of portion 18 of the field winding without reducing the current therethrough, it would be of advantage since a resistance of higher ohmic value could be employed for resistance 28. If the E. M. F. were great enough, resistance 28 could be dispensed with entirely. It is to be understood that other arrangements may be employed for causing the magnetizing force for the poles excited by field winding portion 18 to be different from the magnetizing force for the poles excited by winding portion 17, for example, as by winding the coils constituting winding portion 18 so as to have a different number of turns from the number of turns of the coils constituting winding portion 17. If such arrangement were employed, resistance 28 might be omitted.

This arrangement for the control of the separately excited field winding also is effective in avoiding the occurrence of excessive speeds of the elevator car during the levelling period. The automatic opening of the gate and door during this period renders this feature of particular importance. In systems employing resistance in series with the elevator motor armature to control the speed of the motor during levelling, or where the voltage applied to the armature of the elevator motor during levelling is controlled by means of resistance in series with the separately excited field winding of the generator which supplies power to the motor, there is always a possibility of all or a portion of the resistance becoming grounded or short-circuited, causing the speed of the elevator motor to increase. If mechanism were employed, as in the present system, to effect the automatic opening of the gate and door during the levelling period, the sudden increase in speed might occur while the gate and door were being opened, or after the gate and door were open when the levelling arrangement is slow in bringing the car to a level with the landing. In the present system, resistance 27 is short-circuited during levelling in order to obtain the desired fast levelling speed. Thus it is impossible to obtain excessive speeds of the elevator car during the gate and door opening operation by the application of line voltage to the generator separately excited field as the most that could happen would be to cause the car to run at its fast levelling speed. It is to be understood that contacts could be provided on the field control switch L to break the circuit for the gate motor maintaining relay coil K 130 instead of employing contacts LB 132 and LC 133 in order to insure that the gate and door would not open unless the field winding connections were changed.

As many changes could be made in the above arrangement and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination; a generator having an armature, a plurality of pole pieces and a field winding arranged for separate excitation, said winding comprising a plurality of field coils, one on each pole piece; means for driving said generator armature; a source of current of substantially constant voltage value for said field winding; means for causing the generation of full voltage at the generator terminals with substantially the full value of said source voltage applied to said winding and with said armature driven at a certain speed, said second named means comprising means for connecting said coils to said source in such manner that adjacent pole pieces are excited for opposite polarities; and means for causing the generation of a low voltage at the generator terminals with substantially the full value of said source voltage applied to said winding and with said armature driven at said certain speed, said last included means comprising means for connecting said coils to said source in such manner that each of said pole pieces has at least one adjacent pole piece of like polarity.

2. In combination; a generator having an armature, a plurality of pole pieces, a plurality of brushes of a number equal to the number of pole pieces and a field winding arranged for separate excitation, said winding comprising a plurality of field coils, one on each pole piece; means for driving said generator armature; a source of current of substantially constant voltage value for said field winding; means for causing the generation of full voltage at said brushes with substantially the full value of said source voltage applied to said winding and with said armature driven at a certain speed, said second named means comprising means for connecting said coils to said source in such manner that adjacent pole pieces are excited for opposite polarities; a resistance; and means for causing the generation of a low voltage at said brushes with substantially the full value of said source voltage applied to said winding and with said armature driven at said certain speed, said last included means comprising means for reconnecting said coils to said source in such manner that each of said pole pieces has at least one adjacent pole piece of like polarity and for connecting said resistance in parallel with a portion of said winding.

3. In combination; a generator having an armature, a plurality of pole pieces, a plurality of brushes of a number equal to the number of pole pieces and a field winding arranged for separate excitation, said winding comprising a plurality of field coils, one on each pole piece; means for driving said generator armature; a source of current of substantially constant voltage value for said field winding; means for causing the generation of full voltage at said brushes with substantially the full value of said source voltage applied to said winding and with said armature driven at a certain speed, said second named means comprising means for connecting said coils to said source in such manner that adjacent pole pieces are excited for opposite polarities; a resistance; means for causing the generation of a low voltage of a certain value at said brushes with substantially the full value of said source voltage applied to said winding and with said armature driven at said certain speed, said third named means comprising means for reconnecting said coils to said source in such manner that each of said pole pieces has at least one adjacent pole piece of like polarity and for connecting said resistance in parallel with a portion of said winding; and means for causing current to flow in either direction through all of said coils as reconnected to cause said low voltage at said brushes to be of either polarity.

4. In combination, a motor, a variable voltage generator for supplying current to said motor, said generator having a field winding, a source of current for said winding, means for causing the motor to run at a certain speed, said means comprising means for connecting said field winding to said source, means for causing the motor to run at a slower speed, said last included means comprising means for reversing the connections for a portion of said winding, a resistance and means for connecting said resistance in parallel with said winding portion to decrease the excitation thereof below that of the remainder of the winding.

In testimony whereof, I have signed my name to this specification.

ANTHONY PINTO.